Dec. 10, 1963 V. K. ELORANTA 3,113,497
PHOTOGRAPHIC APPARATUS
Filed Sept. 17, 1962 4 Sheets-Sheet 1

Vaito K. Eloranta
INVENTOR.

BY Brown and Mikulka
and
Robert E. Cork
ATTORNEYS

Dec. 10, 1963  V. K. ELORANTA  3,113,497
PHOTOGRAPHIC APPARATUS
Filed Sept. 17, 1962  4 Sheets-Sheet 2
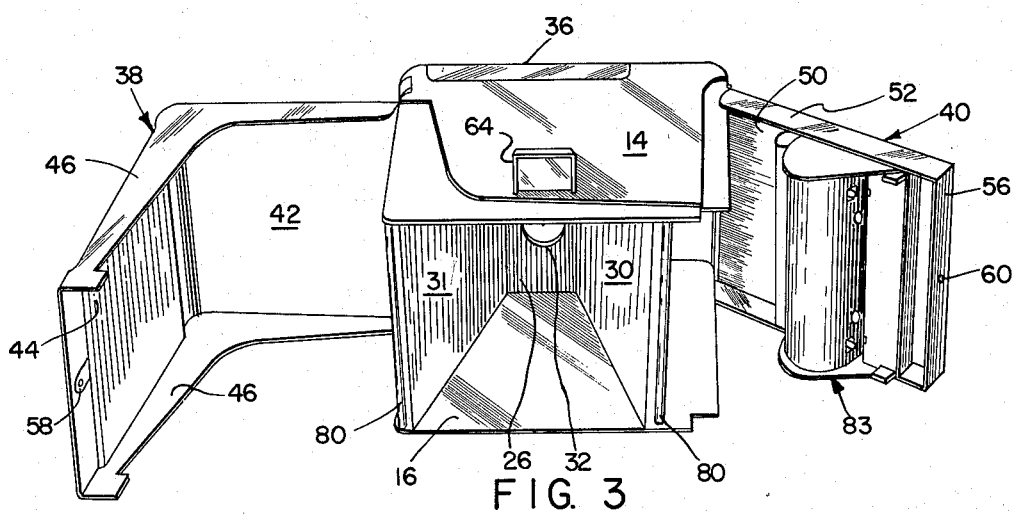
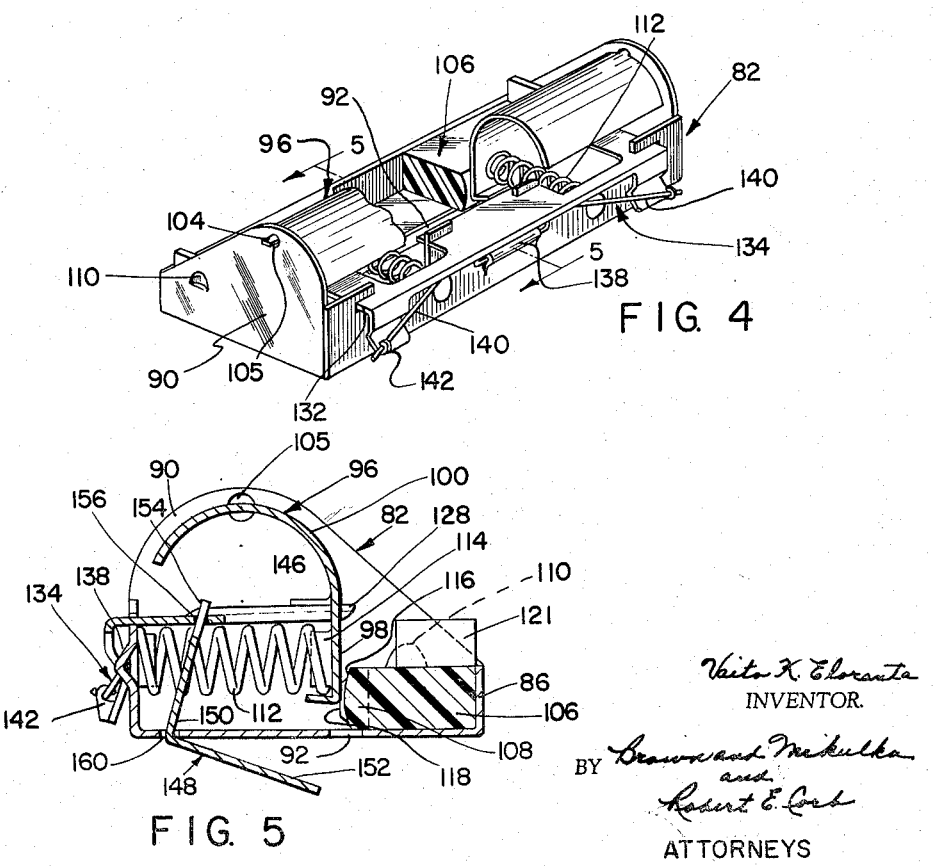
Vaito K. Eloranta
INVENTOR.
BY Brown and Mikulka
and
Robert E. Corb
ATTORNEYS Dec. 10, 1963    V. K. ELORANTA    3,113,497
PHOTOGRAPHIC APPARATUS Filed Sept. 17, 1962    4 Sheets-Sheet 3

Vaito K. Eloranta
INVENTOR.

BY Brown and Mikulka
and
Robert E. Cork
ATTORNEYS

Dec. 10, 1963     V. K. ELORANTA     3,113,497
PHOTOGRAPHIC APPARATUS
Filed Sept. 17, 1962     4 Sheets-Sheet 4
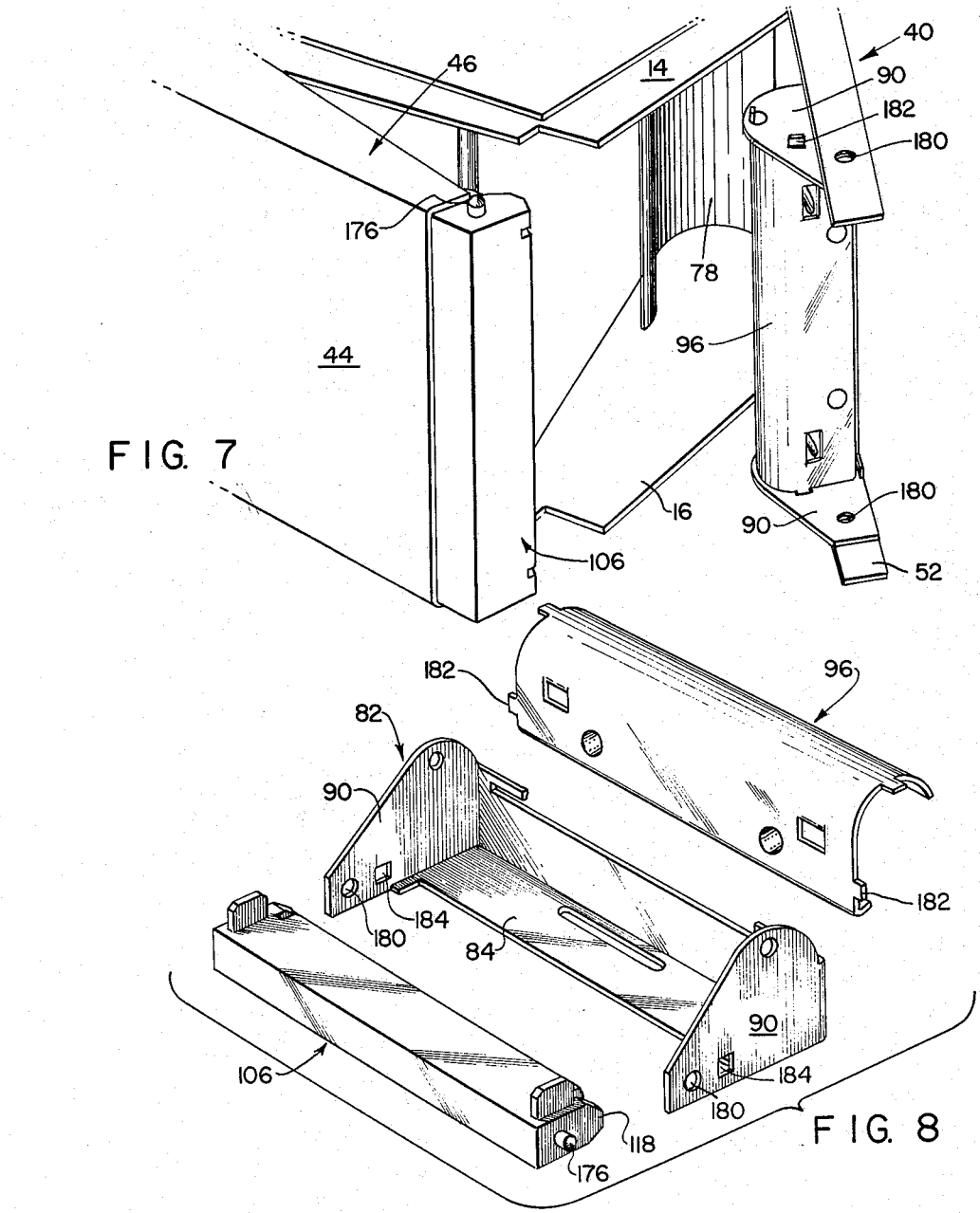
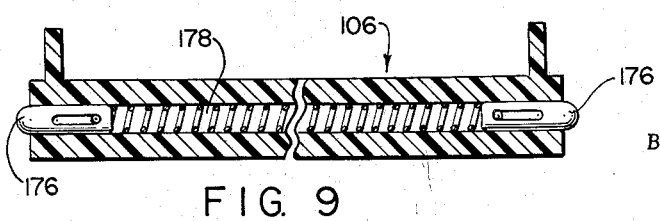
INVENTOR.
ATTORNEYS United States Patent Office 3,113,497
Patented Dec. 10, 1963

3,113,497
PHOTOGRAPHIC APPARATUS
Vaito K. Eloranta, Needham, Mass., assignor to Polaroid Corporation, Cambridge, Mass., a corporation of Delaware
Filed Sept. 17, 1962, Ser. No. 223,925
29 Claims. (Cl. 95—13)

This invention relates to photographic apparatus and particularly to novel and improved apparatus for exposing successive areas of a photosensitive sheet and processing said exposed areas by superposing said photosensitive sheet with a second sheet and distributing a processing composition between said sheets.

An object of the invention is to provide a simple and inexpensive camera of the aforementioned self-developing type including a novel and improved device for controlling the movement of the sheets through the camera, superposing the sheets and distributing a processing liquid therebetween.

Another object of the invention is to provide a device of the character described which is inexpensive and easy to fabricate and assemble and yet is dependable in its operation and produces uniform and predictable results.

A further object of the invention is to provide a device of the type described comprising inexpensive components formed almost entirely of sheet metal and wire and assembled easily without the aid of additional fastening devices, by means comprising integral portions of the components.

Other objects of the invention will in part be obvious and will in part appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a perspective view of the camera of FIGURE 1 with the housing of the camera shown in an open position;

FIG. 4 is a perspective view of the device of the invention;

FIG. 5 is a sectional view, through the device of FIG. 4, taken substantially along the line 5—5;

FIG. 7 is a fragmentary perspective view similar to FIG. 3 illustrating another embodiment of the apparatus;

FIG. 8 is an exploded perspective view of the embodiment of the device shown in FIG. 7; and FIG. 9 is a sectional view of a component of the device of FIG. 8.

The invention is illustrated as incorporated in photographic apparatus in the form of a so-called "box" type of camera for exposing successive areas of a photosensitive sheet and thereafter processing the photosensitive sheet within the camera to produce positive photographic prints from the successive areas. The camera illustrated herein generally includes a housing, means for exposing the photosensitive sheet and means for processing exposed areas of a photosensitive sheet during movement thereof through the housing to produce positive photographic prints. The housing is designed to hold supplies of the photosensitive and second sheets, to position successive areas of the photosensitive sheet for exposure; to support exposure means, which may be a conventional lens and shutter assembly; and to support and enclose the means for controlling the advancement of the sheets and effecting the processing of the photosensitive sheet to produce prints. However, it is this last-mentioned means which is the particular concern of the present invention, since the lens and shutter assembly is conventional and the design and construction of the housing as well as the overall construction of the camera are determined primarily by the construction and cost of the control and processing means.

The design and construction of a camera of this type and the construction of the housing can be simplified and made less expensive if the control and processing means comprise a device incorporating in substantially one unit all (except for the shutter) of the operating components of the camera which coact mechanically with one another and are required to have substantial structural strength, durability, resistance to wear, etc. and are required to be constructed and assembled according to special dimensional tolerances. Such a device, which is the subject matter of the present invention, naturally represents a substantial portion of the overall cost of the camera and should be and has been designed with a view to minimizing the quantity and cost of the materials from which its components are fabricated, simplifying their complexity and hence reducing the cost of fabrication of the individual components, and minimizing the cost of the assembling of the components to form the complete device.

With minor exceptions, the device is formed entirely of components fabricated from sheet metal and wire by conventional metal-forming methods subject to mass production procedures; and the components are assembled together without the necessity for using additional fastening means such as screws, bolts, rivets etc. or by welding, brazing or similar metal-joining operations. The components are held together by integral portions thereof and in some instances both fabrication and assemblage are the same operation or at least concurrent operations.

Figure 1:
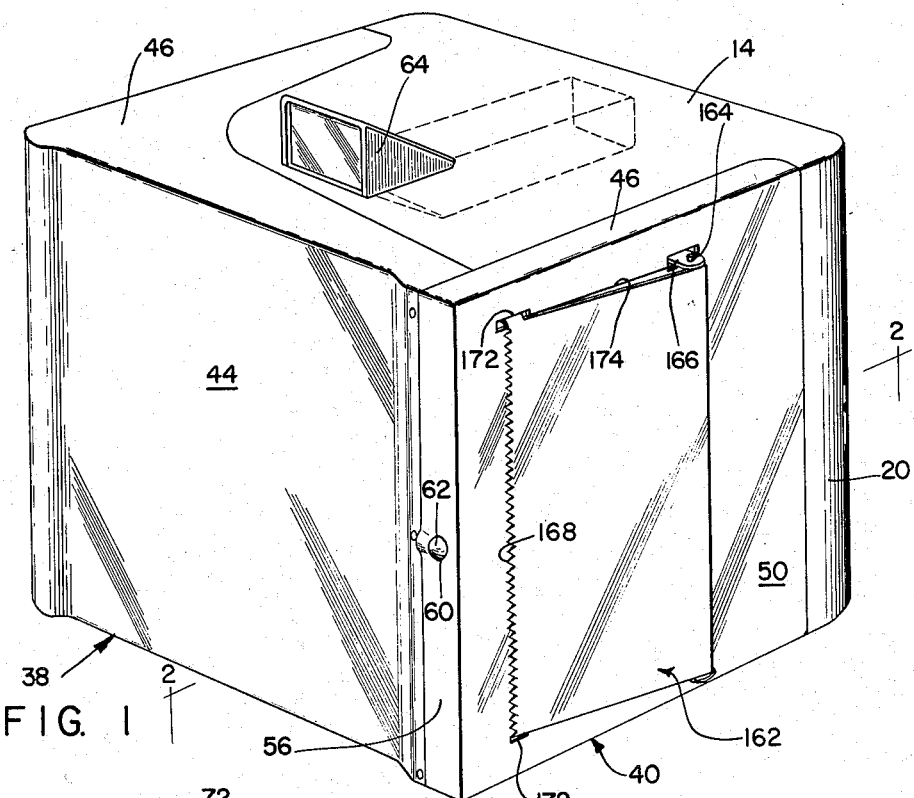
FIGURE 1 is a perspective view of photographic apparatus in the form of a camera embodying the invention.
Figure 2:
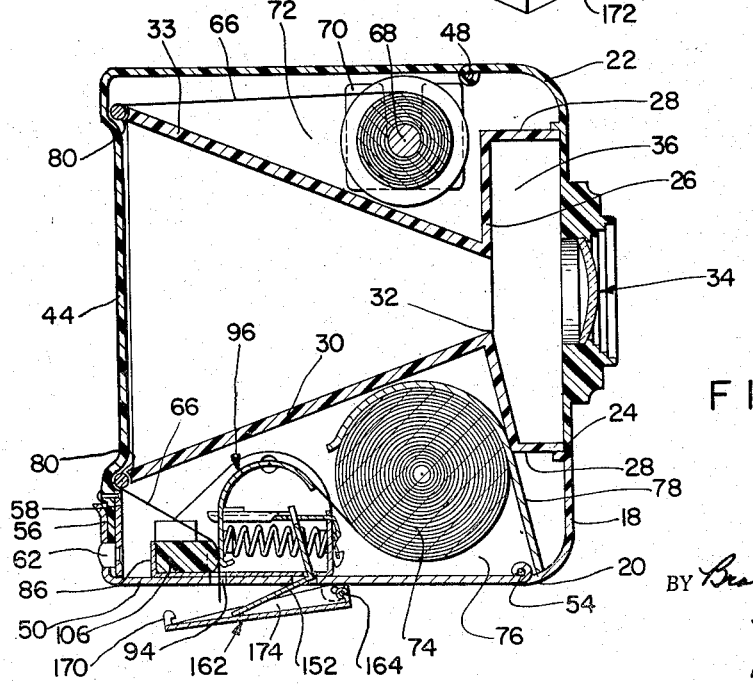
FIG. 2 is a sectional view, through the camera, taken substantially along the line 2—2 of FIGURE 1.
Figure 6:
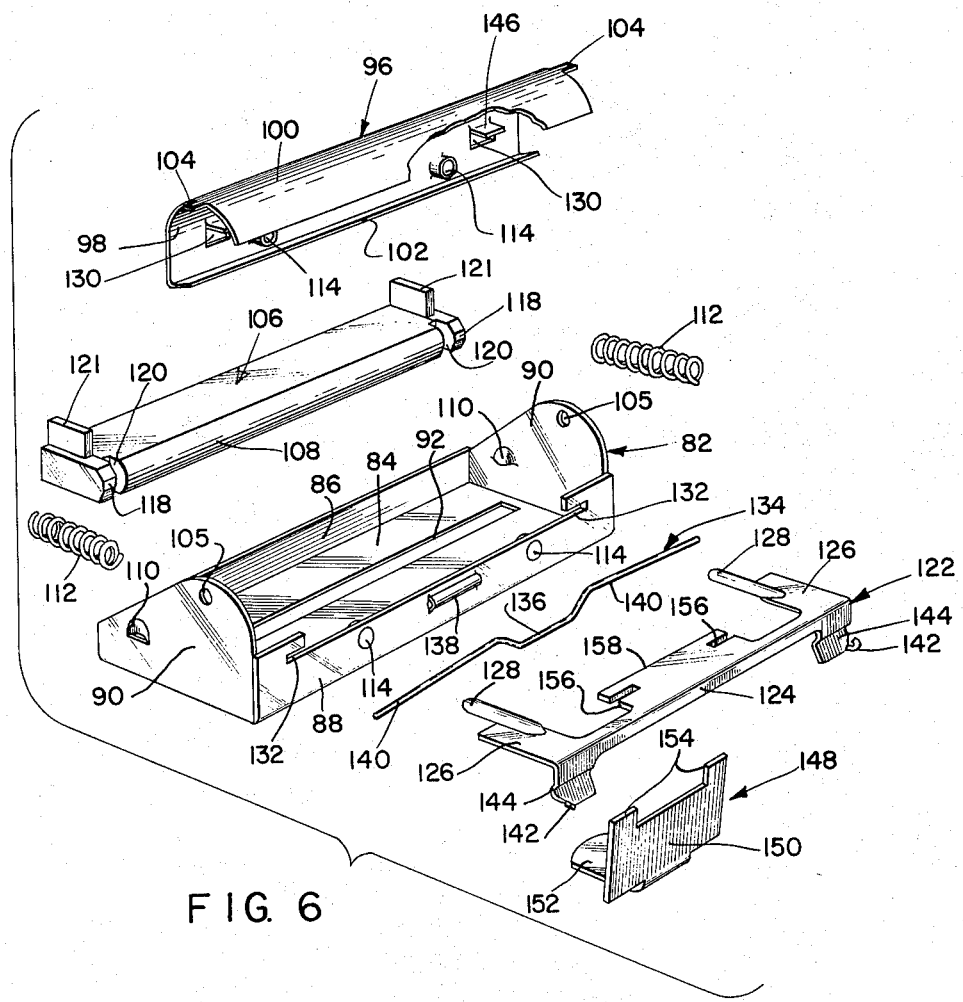
FIG. 6 is an exploded perspective view of the device of FIG. 4.

The control and fluid distributing device of the invention may be incorporated in any photographic apparatus in which it is desired to advance successive areas of a photosensitive sheet intermittently into superposition with a second sheet and distribute a processing liquid between the superposed sheets. The device as shown in FIGS. 1 through 3 is incorporated in a camera including means for holding a supply of the photosensitive and second sheets, locating successive areas of the photosensitive sheet in position for exposure, exposing the successive areas of the photosensitive sheet, and guiding the photosensitive sheet into superposition with the second sheet at the device which is mounted on and enclosed within the housing of the camera. The camera, generally designated 10, comprises a housing includes at least three sections which, for the most part, may be formed inexpensively of organic plastic materials by conventional moulding processes. This is made possible by the fact that the housing is not required to demonstrate any particular degree of structural strength and rigidity nor are there any particularly close tolerances involved. The housing is generally box shaped and comprises a main body section 12 having generally rectangular upper and lower walls designated 14 and 16 respectively, joined by a forward wall 18 and partial right and left side wall 20 and 22 respectively. It is to be understood that the expressions "right" and "left" and "upper" and "lower" and similar expressions, are employed herein for the purposes of description rather than in a limiting sense, since the camera can be employed in positions (other than the preferred), in which these expressions are not applicable.

Forward wall 18 is provided with an opening 24 communicating with a recess defined by an inner forward wall 26 and intermediate upper, lower and side walls designated 28, joining forward wall 18 and inner forward wall 26 around the edges of opening 24. The main body section includes inclined inner side walls 30 and 31 extending from adjacent the edges of an opening 32 in inner forward wall 26, rearwardly and laterally to define the sides of an exposure chamber through which light is conducted from a conventional lens 34 and shutter assembly 36, mounted within the recess defined by inner forward wall 26 and intermediate upper, lower, and side walls 28, to an area of a photosensitive sheet disposed for exposure at the rear of the camera housing.

The camera housing includes first and second movable housing sections designated, respectively, 38 and 40, mounted on main body section 12 for pivotal movement with respect to one another and the main body section. First movable section 38 comprises a left side wall 42, a rear wall 44 and upper and lower flanges 46 designed to overlap marginal portions of upper and lower walls 14 and 16 when first movable section 38 is in a closed position. First housing section 38 is mounted on the rear edge of left side wall 22 at a hinge 48 for pivotal movement between an open position, shown in FIG. 3, at which loading of sheet materials into the apparatus is possible, and a closed or operative position shown in FIGS. 1 and 2 in which left side walls 42 and rear wall 44 comprise respectively the left and rear walls of the housing, and flanges 46 overlap the upper and lower walls of the main body section of the housing to form a lighttight seal. Second movable housing section 40 comprises a right side wall 50 with dependent flanges 52 at its upper and lower edges. Second housing section 40 is mounted at hinge 54 on the rear edge of left side wall 22 for pivotal movement between an open position, shown in FIG. 3, and a closed position, shown in FIGS. 1 and 2, in which flanges 52 overlap lateral portions of upper and lower portions of upper and lower walls 14 and 16 forming a lighttight joint, and right side wall 50 forms the right side wall of the rectangular housing.

First movable housing section 38 is designed for fabrication from moulded organic plastic materials in the same manner as the main body section 12, whereas second movable housing section 40 is preferably fabricated of sheet metal and includes a rear flange 56 designed to overlap the edge portion of rear wall 44 when the two movable housing sections are in closed position. As a means for retaining the movable housing sections in closed position, rear wall 44 is provided with a leaf spring 58 which extends toward left side wall 50 to underlie flange 56 which is formed with an opening 60 for engaging a button 62 mounted on the end of leaf spring 58 and urged thereby into and through opening 60. To release this latch in order to pivot the movable housing sections from their closed positions, the button is depressed from the outside of the housing against the bias of spring 58 to disengage the button from hole 60.

The main body section 12 of camera 10 is provided with a conventional view finder generally designated 64 including a portion extending from upper wall 14 adjacent the rear thereof and another section extending within the camera housing on the inside of upper wall 14 in a position where it does not interfere with light from lens 34.

The camera includes means for mounting and enclosing supplies of the photosensitive and second sheets and positioning successive areas of the photosensitive sheet for exposure to light from lens 34. The photosensitive sheet, designated 66, is supplied on a spool 68 engaged at its ends in a pair of U-shaped mounting members 70 on the inner sides of upper and lower walls 14 and 16 within a storage chamber 72 defined by left side wall 42, inclined inner side wall 31, upper and lower walls 14 and 16 and inner forward wall 26. The second sheet, designated 74, is supplied as a roll and is mounted within a storage chamber 76 defined by right side wall 50, inner side wall 30, upper and lower side walls 14 and 16 and a curved retaining member 78 mounted within storage chamber 76 on and between upper and lower walls 14 and 16. Photosensitive sheet 66 is guided from chamber 72 around the rear edge of inner side wall 31 across the rear of the housing to the rear edge of inner side wall 30 and is supported in position for exposure on the rear edges of inner side walls 30 and 31. As a means for facilitating the movement of photosensitive sheet 66, guide rolls 80 may be provided, as shown in FIG. 2, at the rear edges of inner side walls 30 and 31 pivotally mounted between upper and lower walls 14 and 16 for supporting opposite ends of each exposure area of the photosensitive sheet in position for exposure. Rear wall 44 is preferably formed so that its inner surface is disposed substantially at the focal surface of lens 34 to help support an exposure area of the photosensitive sheet in position for exposure to light from the lens.

In the operation of the camera, successive areas of photosensitive sheet 66 are positioned for exposure against rear wall 44 between the rear edge of inner side walls 30 and 31; and following exposure, each of the exposed areas is advanced into superposition with an area of second sheet 74, and the two sheets are advanced between a pair of juxtaposed members for distributing processing liquid between and in contact with the adjacent surfaces of the two sheets to effect the processing of the exposed photosensitive sheet, preferably to produce a positive transfer image on the second sheet. The processing liquid may be supplied in a succession of rupturable containers each mounted on second sheet 74 adjacent the leading edge of an area thereof adapted to be superposed with an exposed area of the photosensitive sheet. The photosensitive sheet may comprise, for example, a silver halide emulsion carried on a supporting sheet while the processing liquid distributed between and in contact with the two sheets comprise reagents for producing a diffusion-transfer print from the exposed silver halide on the second sheet. For the details of the construction, composition, arrangement and function of the photosensitive and second sheets, the processing liquid and the containers thereof, reference may be had to U.S. Patents Nos. 2,543,181, issued February 22, 1951 and 2,662,822, issued December 15, 1953 both in the name of Edwin H. Land.

The camera includes a unitary device for controlling the advancement of the sheets through the camera to position successive areas of the photosensitive sheet for exposure and thereafter superpose successive exposed areas of the photosensitive sheet with corresponding areas of second sheet 74 and distribute the processing liquid between the superposed sheets to form a sandwich which is withdrawn from the camera. The preferred form of this device shown in FIGS. 2 through 6 comprises a single supporting base assembly, designated 82, fabricated entirely of a single blank of sheet metal formed to provide a generally flat, rectangular base 84 having dependent side members 86 and 88 and dependent end members 90. Base 84 is formed with a withdrawal slot 92 at least equal in length to the width of the sheet material and permitting withdrawal of the sheet materials from the housing. Base assembly 82 is mounted on right side wall 50 within storage chamber 76, the right side wall being provided with a slot 94 corresponding to and aligned with slot 92. Base assembly 82 is mounted within the housing with side member 88 facing forwardly and side member 86 facing rearwardly and spaced from rear flange 56.

The means for distributing the processing liquid between the two sheets comprise a pair of juxtaposed pressure-applying members both mounted on base assembly 82 and providing, between themselves, a gap aligned with slot 94 through which the superposed sheets are advanced in superposition for distributing the processing liquid therebetween to form a sandwich. One of the pressure-applying members, designated 96, is formed of a single elongated blank of sheet metal shaped into a generally J-shaped cross-section to provide a generally planar sheet engagement section 98 which is relatively narrow and has a length at least equal to the width of the sheet materials; a curved (generally cylindrical) guide section 100 along one side of sheet engagement section 98; and a strengthening section 102 comprising a portion of member 96 at the opposite edge of engagement section 98 bent at least at the right angle with respect to engagement section 98 to reinforce the engagement section against flexure and bending. The only critical feature involved in the fabrication of pressure-applying member 96 is that at least a portion of the outer surface of sheet engagement section 98 adjacent strengthening section 102 must lie on a straight line, i.e., be planar, since it is this straight line portion of the surface which cooperates with another pressure-applying member to define a passage through which the sheets are moved for distributing the processing liquid.

As a means for mounting pressure-applying member 96 on base assembly 82, guide section 100 of pressure-applying member 96 is formed at its ends with ears or tabs 104 which are pivotally engaged in round holes 105 formed in end members 90. Pressure-applying member 96 is mounted on base assembly 82 with the aforementioned surface of sheet engagement section 98 facing side member 86 and strengthening section 102 disposed adjacent base 84 between withdrawal slot 92 and side member 88.

A second pressure-applying member 106 in the form of a generally parallelepiped shaped block is provided secured to base assembly 82 against side member 86 between end members 90 and against base 84 between side member 86 and withdrawal slot 92. Pressure-applying member 106 is the only element of the device 81 which is not formed of either sheet material or wire and is formed of any substantially rigid, hard material such as metal or the organic plastics, the latter being preferred because of their ease of fabrication and low cost. Pressure-applying member 106 is formed with a sheet engaging edge portion 108 having a curved (e.g. cylindrical) surface at least equal in length to the width of the area of the image to be formed on the second sheet and including a section lying in a straight line. Pressure-applying member 106 is mounted on base assembly 82 with sheet engaging edge section 108 juxtaposed with sheet engagement section 98, and it is these two sections of the pressure-applying members which superpose the sheets and define a passage having substantially straight parallel sides through which the sheets are moved in superposition to distribute the processing liquid. Pressure-applying member 106 is retained on base assembly 82 by piercing and depressing sections of end members 90 to form projections 110 and engaging member 106 at its ends to retain the member against base 84.

Sheet engagement section 98 of member 96 is biased toward pressure-applying member 106 by a pair of coiled springs 112 engaged at their ends between engagement section 98 of member 96 and side member 88 of base assembly 82. As a means for retaining the springs in position, portions of side member 88 and engagement section 98 are deformed toward one another to provide tubular projections 114 which extend into the ends of springs 112.

The only remaining dimensionally critical feature of the fluid-distributing device is the width of the passage, designated 116, between sheet engagement section 98 of pressure-applying member 96 and sheet engaging edge section 108 of pressure-applying member 106. As a means for determining the width of this passage, pressure-applying member 106 is provided at its ends with projecting sections 118 which extend beyond sheet engaging section 108 at its ends into engagement with the ends of sheet engagement section 98 predeterminedly spacing the latter from the sheet engaging section 108. The critical dimension here is the extent to which projecting section 118 is extended beyond the portion of sheet engaging edge section 108 lying in a straight line and located closest to the straight line portion of the surface of sheet engagement section 98.

The processing liquid for each exposed area is supplied in a rupturable container mounted on the second sheet. Containers of this type are designed to release their liquid contents in one direction as an elongated mass when subjected to compressive pressure exerted thereon as the container is advanced together with the sheets between a pair of pressure-applying members. There may be a tendency for the liquid to spread laterally between the sheets and, to prevent its escape from between the margins of the sheets at the lateral edges thereof, pressure-applying member 106 is constructed so that no compressive pressure is applied to the lateral margins of the sheets, which pressure might otherwise tend to squeeze the liquid from between the sheets. Accordingly, member 106 is provided with a pair of grooves or recesses 120 at the ends of sheet engaging edge section 108 between the latter and projecting sections 118. Recesses 120 are at least equal in width to the lateral margins of the sheets at the lateral edges of the image areas so that the marginal portion of the sheets are free to separate as they pass between the pressure-applying members through passage 116 thereby trapping and retaining any of the processing liquid which is spread laterally beyond the image areas toward the edges of the sheets.

Camera 10 is initially loaded with supplies of the photosensitive and second sheets with the leading ends of the two sheets joined together at a leader which is threaded between pressure-applying members 96 and 106 through passage 116 and withdrawal slot 94, to project from the camera housing where the leader may be engaged manually for advancing the sheets through the apparatus and withdrawing the sandwich comprising the two sheets and the processing liquid distributed therebetween from the housing. Since processing of the sheets is completed outside of the housing in the light, both sheets are formed of a material, or provided with a layer of a material, which is opaque to light actinic to the photosensitive sheet. Advancement of the sheets through the apparatus is manual and control and fluid distributing device 81 includes means for arresting the movement of the sheets at predetermined positions to locate each successive area of the photosensitive sheet in position for exposure and then to permit the continued advancement of the sheets to effect the processing of the exposed area and advancement of the next succeeding area of the photosensitive sheet into position for exposure.

The aforementioned control or indexing means comprise means for engaging portions of one of the sheets, preferably the second sheet, for arresting the movement of the sheets and is disengageable from the sheets to permit their continued advancement. In the form shown, the indexing means comprise members for engaging regularly spaced pairs of apertures in the marginal portions of the second sheet, each pair of apertures being predeterminedly associated with an area of the second sheet which is adapted to be superposed with an exposed area of the photosensitive sheet. The members which engage the apertures in the second sheet are designed to bear against the marginal portions of the second sheet as the latter is moved past the members and to become engaged in the apertures of the second sheet arresting the movement of the second sheet as the apertures move into alignment with the members. The indexing means comprise a stop member 122 formed of a single blank of sheet metal and including an elongated base section 124 having a generally L-shaped cross-section, and two spaced arms 126 at the ends of base section 124 terminating in sheet engagement fingers 128 designed to become engaged in the aforementioned apertures and the margins of the second sheets for arresting movement of the second sheet. Stop member 122 is mounted on side member 88 with fingers 128 projecting through openings 130 in sheet engagement section 98 of pressure-applying member 96. Openings 130 are so formed as to permit limited movement of fingers 128 in the direction of movement of the sheets between pressure-applying members 96 through passage 116. Stop member 122 is mounted on side member 88 for pivotal movement about base section 124 to allow fingers 128 to move in the direction of movement of the sheets within openings 130 and sliding or reciprocating movement of the fingers within openings 130 in directions perpendicular to the direction of movement of the sheets and the plane of sheet engagement section 98. As a means for mounting stop member 122 for both pivotal and sliding movement, side member 88 is provided with a recess and opposed slots 132 in which arms 126 are slidably and pivotally engaged.

Means are also provided for retaining stop member in slots 132 and simultaneously biasing fingers 128 toward engagement section 98 into engagement with the sheets and for pivotal movement in a counterclockwise direction (viewing FIG. 5), i.e., the fingers are biased in a direction opposite to the direction of movement of the sheets between the pressure-applying members. These last-mentioned means comprise an elongated wire spring 134 formed with a medial section 136 engaged in a channel-shaped retaining member 138 comprising a portion of side member 88 deformed outwardly. Spring 134 is in the form of a somewhat flattened M, having medial legs joined to medial section 136 and end legs 140 engaged in hooks 142 formed as part of pivot members 144, the latter having V-shaped cross-sections and being dependent from base section 124 adjacent the ends thereof. The apex of each of pivot member 144 is located between hook 142 and base section 124 so that the stop member tends to pivot about the apices of pivot members 144. Spring 134 engaged with pivot members 144 and hooks 142 urge the stop member toward side member 88 while tending to pivot the stop member in counterclockwise direction (viewing FIG. 5), about the apices of pivot members 144.

In the operation of the indexing means, as second sheet 74 is advanced around guide section 100 of pressure-applying member 96 into passage 116 between the pressure members, the ends of fingers 128 are urged into engagement with the marginal portions of the second sheet while the upper portions of the fingers are disposed in contact with the upper edges of openings 130 in sheet engagement section 98 of pressure-applying member 96. As a pair of holes in the marginal portion of the second sheet become aligned with fingers 128, the fingers enter the holes and are displaced within openings 130 in the direction of movement of the sheet until displacement of the fingers is arrested by the lower edges of openings 130. To release the sheets for continued advancement, the fingers need only be withdrawn from the holes in the sheets whereupon the fingers under the bias of spring 134 move upwardly in a direction opposite the direction of movement of the sheets and when allowed to again move toward the sheets engage portions of the sheets adjacent and behind the holes in which they were previously engaged in readiness to enter the next succeeding pair of holes in the second sheet to arrest the movement of the sheets as these next succeeding pairs of holes become aligned with the fingers. To insure that fingers 128 re-enter and project through openings 130 in pressure-applying member 96 following their withdrawal, openings 130 are formed by bending portions of sheet engagement section 98 inwardly in the upper edges of the holes to form tabs 146 extending parallel with the fingers toward base section 124.

Means operable manually and from the outside of the apparatus are provided for displacing fingers 128 from engagement with holes in the second sheet; and, in the form shown, these means comprise a control member 148 in the form of a blank of sheet metal having an L-shaped cross-section including a first arm 150 and a second arm 152. First arm 150 includes a pair of fingers 154 which are engaged in slots 156 in a medial portion 158 of base section 124 of stop member 122. Second arm 152 projects from the camera housing through a slot 160 formed in base 84 between slot 92 and side member 88 and in which control member 148 is mounted for pivotal movement about the juncture of arms 150 and 152. Pivotal movement of control member 148 in a counterclockwise direction, viewing FIG. 5, is effective to withdraw fingers 128 to the left, viewing the same figure, from engagement with the second sheet and the holes therein. Upon such withdrawal, the fingers then move in a direction opposite the direction of movement of the sheet so that when control member 148 is released, the fingers return under the bias of spring 134 into engagement with the sheets behind the holes therein.

The sheet engagement fingers of stop member 122 previously held out of engagement with the second sheet when the cutter bar was in closed position are, by virtue of this necessary movement of the cutter bar, allowed to return to engagement with the second sheet in readiness to arrest the advancement of the sheets. The operator then withdraws the sheets from the housing through slots 92 and 94 until movement of the sheets is arrested whereupon the cutter bar is pivoted to its closed position and the portion of the sheets extending beyond the cutter bar are torn against the sharpened edge thereof. Pivotal movement of the cutter bar to its closed position is also effective to disengage the sheet engaging fingers of the stop member from the holes in the second sheet so that the sheets may again be advanced through the camera following opening of the cutter bar.

The camera includes means for covering slots 92 and 94 and severing a portion of the sandwich extending from the housing through slots 92 and 94 from other portions of the sandwich remaining in the housing. These last-mentioned means comprise a generally rectangular, flat cutter bar 162 pivotally mounted adjacent one edge on a spring pin 164 engaged at its ends at mounting members 166 in the form of tabs, turned up from either base 84 or right side wall 50, and located forwardly of slots 92, 94 and 160. Cutter bar 162 is pivotable between a closed position shown in FIGURE 1 in which it extends across slots 92 and 94 toward the rear of the camera and an open position, shown in FIG. 2, in which the slots are uncovered. When the cutter bar is in the closed position, it engages second arm 152 pivoting the latter inwardly (in a counterclockwise direction viewing FIG. 5) withdrawing fingers 128 from engagement with the second sheet. When the cutter bar is opened to advance the sheets through the apparatus, the control member is disengaged allowing the control member to move under bias of spring 134 locating fingers 128 in engagement with the sheets in readiness to arrest the advancement of the sheets as a pair of holes in the second sheet become aligned with the fingers. The edge, designated 168, of the cutter bar furthest from spring pin 164 is sharpened and/or serrated to facilitate severing of the sandwich by withdrawing the sandwich against edge 168. The cutter bar also includes latch means for retaining it in a closed position, the latching means comprising a pair of hook-shaped latch members 170 on the ends of the cutter bar adjacent edge 168 adapted to engage right side wall 50 at the ends of slots 172 formed therein. Cutter bar 162 is secured to the medial portion of spring pin 164 and includes flanges 174 at its ends having slots through which the end portions of the spring pin extend into engagement with mounting members 166. This construction permits the cutter bar to be displaced parallel with right side wall 50 for engaging and disengaging latch members 170 from slots 172. The spring pin, cutter bar, flanges, mounting members and latch members and slots are all constructed so that the spring pin retains the latch members in engagement with the slots until the cutter bar is required to be displaced against the resiliency of the spring pin in order to disengage the latch members.

Second pressure-applying member 106 is provided on the surface thereof opposite base 84 with a pair of upstanding guide members 121 for engaging the lateral edges of the photosensitive sheet and guiding the photosensitive sheet between the pressure-applying members into proper alignment with the second sheet. The operation of the camera following loading is quite simple requiring that the operator displace to one latch and then open cutter bar 162 to enable him to grasp either the leader or portions of the sheets extending through slots 94 and 96, from the camera housing underlying the cutter bar.

The camera, and particularly device 81 shown and described hereinbefore, are of the "thread loading" type, so called because the leading ends of the two sheets are required to be threaded between the pressure-applying members which are both mounted together on a single support. The present invention contemplates another embodiment of the control and fluid-distributing device in which the pressure-applying members are mounted on different sections of the housing obviating the necessity for threading the leading ends of the sheets through a narrow passage between the pressure-applying members. Such a construction is shown in FIGS. 7 and 8, and is characterized by the fact that the forces exerted by the pressure-applying members in acting against one another are taken up by base assembly 82 rather than any section of the camera housing, and the only tolerances are those previously mentioned, all of which are found in device 81 rather than in the camera housing. This last-mentioned embodiment of device 81 is basically the same as that previously described with certain modifications in the structure. These modifications include the elimination of the portion of base 84 located rearwardly of slot 92 and the elimination of side member 86 dependent from this portion of the base and normally cooperating therewith to mount and position pressure-applying member 106. Pressure-applying member 106 is mounted near the rear of right side wall 50 on movable housing section 40 and includes a pair of spring biased latch pins 176 extending beyond the ends of pressure-applying member 106 from a lengthwise bore 178 and are adapted to be engaged in openings 180 in end members 90 of base assembly 82 when the housing sections are in closed position. Latch member 176 also functions to retain the movable housing sections in closed position and can be disengaged from openings 180 by the application of pressure manually against the ends thereof extending into the openings. Projecting sections 118 of pressure-applying member 106 function in the same manner as previously described to properly locate the pressure-applying members with respect to one another. Inasmuch as pressure-applying member 106 may be displaced from pressure-applying member 96, as when the movable housing sections are in open position, means are provided for permitting the pivotal movement of pressure-applying member 96 under the bias of springs 112. These last-mentioned means comprise ears or tabs 182 formed at the ends of sheet engagement section 98 and engaged for limited movement in openings 184 in end members 90. In this embodiment of the camera, loading is accomplished simply by opening the two movable housing sections, dropping in the spools and rolls of, respectively, the photosensitive and second sheets, into the proper storage chambers, and then pivoting the housing sections to their closed position so that the pressure-applying members engage opposite sides of a leader common to both the photosensitive and second sheets.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus in which successive areas of an image-recording sheet are exposed and thereafter processed in conjunction with a second sheet by a liquid distributed between said sheets, a device for controlling the advancement of said sheets through said apparatus and distributing said liquid between said sheets, said device comprising, in combination:

a support including a base and opposed end members and a side member dependent, respectively, from opposite ends and one side of said base;

a first pressure member formed of sheet metal and including an engagement section terminating in a bent edge section and including a surface portion lying on a straight line;

said first pressure member being supported at its ends on said end members, with said surface portion facing away from said side member, for limited movement toward and away from said side member;

first spring means engaged between said engagement section and said side member for urging said engagement section away from said side member;

a second pressure member including an engagement surface lying on a straight line;

retaining means associated with said end members and said second pressure member for securing said second pressure member to said support in a substantially fixed position with said engagement surface in juxtaposed facing relation with said surface portion of said first pressure member;

said second pressure member including projections adjacent the ends of said engagement surface for coacting with said engagement section of said first pressure member for predeterminedly spacing said surface portion and said engagement surface of said pressure members to provide a passage of predetermined minimum width through which said sheets are movable in superposition for distributing said liquid therebetween;

a stop member having a pair of fingers for engaging portions of one of said sheets at the margins thereof;

said engagement section being formed with a pair of openings adjacent its ends;

said stop member being mounted on said side member with said fingers extending through said openings into the path of movement of said one sheet between said pressure members;

said stop member being mounted for movement of said fingers in a plurality of directions including movement toward and away from said engagement section in a direction generally perpendicular to the direction of movement of said one sheet across said engagement section between said pressure members, and movement in a direction generally parallel with said direction of movement of said one sheet;

said openings being so formed as to permit limited movement of said fingers in said directions generally perpendicular to and parallel with said direction of movement of said one sheet;

second spring means mounted on said other side member in engagement with said stop member for biasing said fingers toward said one sheet in a direction opposite to said direction of movement thereof; and a control member movably mounted on said base in engagement with said stop member, said control member being movable for displacing said stop member away from said engagement section to disengage said fingers from said one sheet.

2. The photographic apparatus of claim 1 including a housing comprising two relatively movable sections and wherein said support is mounted on one of said housing sections and said second pressure member is mounted on the other of said housing sections.

3. The photographic apparatus of claim 2 in which said retaining means is releasable to permit movement of said other housing section including said second pressure member relative to and apart from said one housing section and said first pressure member.

4. The photographic apparatus of claim 3 is which said housing section includes portions cooperating to provide an opening in said housing aligned with said passage between said pressure members for permitting movement of said superposed sheets through said opening from said housing.

5. The photographic apparatus of claim 4 in which a closure member is provided mounted on the side of said base opposite said pressure members for movement between a closed position in which said closure member is disposed adjacent said base in covering relation to said opening and an open position in which said closure member is displaced from said base and said opening is unobstructed.

6. The photographic apparatus of claim 5 in which said base is provided with a slot intermediate said opening in said side member, said control member includes a section projecting from said apparatus through said slot, and said closure member, during movement from said first to said second position, coacts with said section of said control member to move said stop member so as to disengage said fingers from said one sheet.

7. In photographic apparatus in which successive areas of an image-recording sheet are exposed and thereafter processed in conjunction with a second sheet by a liquid distributed between said sheets, a device for controlling the advancement of said sheets through said apparatus and distributing said liquid between said sheets, said device comprising, in combination:
   a support including a base and opposed end and side members supported on said base;
   a first pressure member mounted on said base adjacent one of said side members, extending between said end members and having a surface at least a portion of which faces the other of said side members and lies on a straight line;
   a second pressure member including an engagement section having a surface at least a portion of which lies on a straight line;
   said second pressure member being supported at its ends on said end members, with said surface of said engagement section juxtaposed with said surface of said first pressure member, for movement toward and away from said first pressure member;
   first spring means engaged between said other side member and said engagement section for urging the latter toward said first pressure member;
   said first pressure member including projections adjacent the ends of said surface thereof for coacting with said engagement section to predeterminedly space said surfaces of said pressure members to provide a passage of predetermined minimum width through which said sheets are movable in superposition for distributing said liquid therebetween;
   a stop member having a pair of fingers for engaging portions of one of said sheets at the margins thereof;
   said engagement section being formed with a pair of openings adjacent its ends;
   said stop member being mounted on said other side member with said fingers extending through said openings into the path of movement of said one sheet between said pressure members;
   said stop member being mounted for movement of said fingers in a plurality of directions including movement toward and away from said engagement section in a direction generally perpendicular to the direction of movement of said one sheet across said engagement section between said pressure members, and movement in a direction generally parallel with said direction of movement of said one sheet;
   said openings being so formed as to permit limited movement of said fingers in said directions generally perpendicular to and parallel with said direction of movement of said one sheet;
   second spring means mounted on said other side member in engagement with said stop member for biasing said fingers toward said one sheet and in a direction opposite to said direction of movement thereof; and
   a control member movably mounted on said base in engagement with said stop member, said control member being movable for displacing said stop member away from said engagement section to disengage said fingers from said one sheet.

8. The photographic apparatus of claim 7 in which said support comprises a blank of sheet metal formed to provide a generally rectangular base with said end and side members dependent from the end and sides, respectively, of said base.

9. The photographic apparatus of claim 8 in which said base is formed with a slot aligned with said passage between said surfaces of said pressure members for admitting said superposed sheets.

10. The apparatus of claim 8 in which said control member includes a first section engaged with said stop member and a second section, said base is formed with a second slot through which said second section of said control member projects from said apparatus and is engageable for moving said stop member.

11. The photographic apparatus of claim 9 in which a closure member is mounted on the side of said base opposite said pressure members for movement between a closed position in which said closure member is disposed adjacent said base in covering relation to said slot and an open position in which said closure member is displaced from said base and said slot is uncovered.

12. The photographic apparatus of claim 10 in which said base is provided with a second slot intermediate the first-mentioned slot and said other side member, said control member includes a section projecting from said apparatus through said second slot, and said closure member, during movement from said first to said second position, coacts with said section of said control member to move said stop member to disengage said fingers from said one sheet.

13. The photographic apparatus of claim 12 in which said closure member is pivotally mounted at one edge and its opposite edge is sharpened to provide means against which said sheets, projecting from said apparatus through said first-mentioned slot, may be drawn for severing said sheets.

14. The photographic apparatus of claim 8 in which said first pressure member comprises an elongated bar offering substantial resistance to bending in at least one tranverse direction in a plane including said straight line.

15. The photographic apparatus of claim 8 in which said first and second pressure members are mounted with said straight lines disposed in substantially parallel relation in a plane and said second pressure member is mounted on said end members for limited pivotal movement about an axis substantially parallel with said lines and displaced from said plane.

16. The photographic apparatus of claim 15 in which said second pressure member is formed of sheet metal and includes tabs pivotally engaged in openings formed in said end members.

17. The photographic apparatus of claim 8 in which said stop member includes a base section supporting said fingers, pivotally and slidably mounted on said other side member in slots formed therein;
   and said second spring means comprise an elongated resilient element mounted intermediate its ends on said other side member and engaged at its ends with portions of said base section disposed on the opposite side of said other side member from said fingers for biasing said control member linearly toward said one member and pivotally so as to urge said fingers, extending from said base, in said direction opposite to said direction of movement of said one sheet.

18. In photographic apparatus in which successive areas of an image-recording sheet are exposed and thereafter processed in conjunction with a second sheet by a liquid distributed between said sheets, a device for controlling the advancement of said sheets through said apparatus and distributing said liquid between said sheets, said device comprising, in combination:

a support including a base and opposed end and side members supported on said base;

a first pressure member comprising a substantially rigid bar mounted on said base adjacent one of said side members, extending between said end members and having a surface at least a portion of which faces the other of said side members and lies on a straight line;

a second pressure member formed of sheet metal and including an engagement section having a surface at least a portion of which lies on a straight line and an edge section bent at least 90° with respect to said engagement section along a line substantially parallel with and adjacent the last-mentioned straight line in order to stiffen said engagement section against bending;

said second pressure member being supported at its ends on said end members, with said surface of said engagement section juxtaposed with said surface of said first pressure member, for movement toward and away from said first pressure member;

first spring means engaged between said other side member and said engagement section for urging the latter toward said first pressure member;

said first pressure member including projections adjacent the ends of said surface thereof for coacting with said engagement section to predeterminedly space said surfaces of said pressure members to provide a passage of predetermined minimum width through which said sheets are movable in superposition for distributing said liquid therebetween;

a stop member having a pair of fingers for engaging portions of one of said sheets at the margins thereof;

said engagement section being formed with a pair of openings adjacent its ends;

said stop member being mounted on said other side member with said fingers extending through said openings into the path of movement of said one sheet between said pressure members;

said stop member being mounted for movement of said fingers in a plurality of directions including movement toward and away from said engagement section in a direction generally perpendicular to the direction of movement of said one sheet across said engagement section between said pressure members, and movement in a direction generally parallel with said direction of movement of said one sheet;

said openings being so formed as to permit limited movement of said fingers in said directions generally perpendicular to and parallel with said direction of movement of said one sheet;

second spring means mounted on said other side member in engagement with said stop member for biasing said fingers toward said one sheet and in a direction opposite to said direction of movement thereof; and a control member movably mounted on said base in engagement with said stop member, said control member being movable for displacing said stop member away from said engagement section to disengage said fingers from said one sheet.

19. The photographic apparatus of claim 18 in which said second pressure member comprises a generally rectangular blank formed into a generally J-shaped cross-section including a curved section for guiding said one sheet into superposition with the other of said sheets between said pressure members and a generally planar portion terminating in said bent end section and providing said engagement section.

20. The photographic apparatus of claim 19 in which said second pressure member is pivotally mounted on tabs formed at the ends of said curved section and engaged in holes in said end members.

21. The photographic apparatus of claim 20 in which said support comprises a blank of sheet metal formed to provide a generally rectangular base with said end and side members dependent from the ends and sides, respectively, of said base.

22. The photographic apparatus of claim 21 in which said first spring means comprise springs engaged at their ends on retaining members formed from portions of second pressure member and said other side member.

23. The photographic apparatus of claim 18 in which said stop member is formed of sheet metal and comprises a base section supporting said fingers and slidably and pivotally mounted on said other side member in slots formed therein; and said second spring means comprise an elongated resilient element mounted intermediate its ends on said other side member and engaged at its ends with portions of said base section disposed on the opposite side of said side member from said fingers for biasing said control member linearly toward said one member and pivotally so as to urge said fingers, extending from said base, in said direction opposite to said direction of movement of said one sheet.

24. The photographic apparatus of claim 18 in which said base is formed with said slot aligned with said passage between said surfaces of said pressure members for allowing withdrawal movement of said superposed sheets through the last-mentioned slot from said apparatus.

25. The apparatus of claim 24 in which said control member is formed of sheet metal and includes a first section engaged with said stop member in slots formed therein, and a second section, and said base is formed with a second slot through which said second section of said control member projects from said apparatus for engagement to move said stop member.

26. The photographic apparatus of claim 24 in which a closure member formed of sheet metal is mounted on the side of said base opposite said pressure members for movement between a closed position in which said closure member is disposed adjacent said base in covering relation to said slot and an open position in which said closure member is displaced from said base and said slot is unobstructed.

27. The photographic apparatus of claim 26 in which said base is provided with a second slot intermediate the first-mentioned slot and said other side member, said control member includes a section projecting from said apparatus through said second slot and said closure member, during movement from said first to said second position, coacts with said section of said control member to move said stop member so as to disengage said fingers from said one sheet.

28. The photographic apparatus of claim 27 in which said closure member is pivotally mounted at one edge and its opposite edge is sharpened to provide means against which said sheets projecting from said apparatus through said first-mentioned slot may be drawn for severing said sheets.

29. In photographic apparatus in which successive areas of an image-recording sheet are exposed and thereafter processed in conjunction with a second sheet by a liquid distributed between said sheets, a device for controlling the advancement of said sheets through said apparatus and distributing said liquid between said sheets, said device comprising, in combination:

a support comprising a blank of sheet metal formed to provide a base with side and end members dependent from the sides and ends, respectively, of said base;

a first pressure member comprising a substantially rigid bar mounted on said base adjacent one of said side members, extending between said end members and having a surface including a portion facing the other of said side members and lying on a straight line;

a second pressure member formed of sheet metal and including an engagement section having a surface including a portion lying on a straight line and an edge section bent at least 90° with respect to said engagement section along a line substantially parallel with and adjacent the last-mentioned straight line for stiffening said engagement section against bending;

said second pressure member being supported at its ends on said end members for movement toward and away from said pressure member and with said surface of said engagement section juxtaposed with said surface of said first pressure member;

first spring means engaged between said other side member and said engagement section for urging the latter toward said first pressure member;

said first pressure member including projections adjacent the ends of said surface thereof for coacting with said engagement section to predeterminedly space said surfaces of said pressure members at said straight lines to provide a passage of predetermined width through which said sheets are movable in superposition for distributing said liquid therebetween;

a stop member formed of sheet metal and having a pair of fingers for engaging portions of one of said sheets at the margins thereof;

said engagement section being formed with a pair of openings adjacent its ends;

said stop member being pivotally and slidably mounted on other side member in slots formed therein with said fingers extending through said openings into the path of movement of said one sheet between said pressure members;

said stop member being mounted for movement of said fingers toward and away from said engagement section in a direction generally perpendicular to the direction of movement of said one sheet across said engagement section between said pressure members and in a direction generally parallel with said direction of movement of said one sheet;

said openings in said engagement section being so formed as to permit limited movement of said fingers in said direction generally perpendicular to and parallel with said direction of movement of said one sheet;

second spring means mounted on said other side member in engagement with said stop member for biasing said fingers toward said one sheet and in a direction opposite to said direction of movement thereof; and a control member formed of sheet metal movably mounted in a slot in said base in engagement with a slot in said stop member, said control member being movable for displacing said stop member away from said engagement section to disengage said fingers from said one sheet.

References Cited in the file of this patent
UNITED STATES PATENTS

| | | |
|---|---|---|
| 2,483,014 | Land | Sept. 27, 1949 |
| 2,740,343 | Land | Apr. 3, 1956 |
| 2,930,300 | Danders | Mar. 29, 1960 |
| 2,991,703 | Eloranta | July 11, 1961 |